United States Patent [19]

Schmitt et al.

[11] Patent Number: 5,075,402

[45] Date of Patent: Dec. 24, 1991

[54] NON-TOXIC, STABLE LIGNOSULFONATE-UREA-FORMALDE-HYDE COMPOSITION AND METHOD OF PREPARATION THEREOF

[75] Inventors: Linda G. Schmitt, Wausau; John W. Hollis, Jr., Schofield, both of Wis.

[73] Assignee: Ligno Tech. U.S.A., Rothschild, Wis.

[21] Appl. No.: 617,926

[22] Filed: Nov. 21, 1990

Related U.S. Application Data

[63] Continuation of Ser. No. 328,887, Mar. 27, 1989, abandoned.

[51] Int. Cl.⁵ .............................................. C08L 97/02
[52] U.S. Cl. .................................. 527/400; 106/123.1
[58] Field of Search ...................... 527/400; 106/123.1

[56] References Cited

U.S. PATENT DOCUMENTS

| | | | |
|---|---|---|---|
| 2,622,979 | 8/1947 | Keim | 527/400 |
| 2,664,408 | 2/1950 | Plump et al. | 527/400 |
| 3,931,072 | 1/1976 | Coyle | 527/403 |
| 3,990,928 | 11/1976 | Schmidt-Helleran et al. | 524/14 |
| 3,994,850 | 11/1976 | Willegger et al. | 528/265 |
| 4,130,515 | 12/1978 | Bornstein | 527/400 |
| 4,186,242 | 1/1980 | Holmquist | 428/528 |
| 4,194,997 | 3/1980 | Edler | 260/17.5 |
| 4,244,846 | 1/1981 | Edler | 260/17.3 |
| 4,666,522 | 5/1987 | Hollis, Jr. et al. | 106/123.1 |

FOREIGN PATENT DOCUMENTS 202450 6/1983 Czechoslovakia .
89056 4/1986 Romania .
1237678 6/1986 U.S.S.R. .

OTHER PUBLICATIONS

Abstract of an article entitled "Infrared Spectroscopic Investigation of Polycomplexes Based on Lignosulfonates and Urea-Formaldehyde Resins", by Krut'ko et al. in Ah. Prikl. Spektr. 48, No. 1:95-98, Jan. 1988.

Abstract of an article entitled "Decreasing the Consumption of Urea Binders in the Production of Particleboards", by Doronin et al., Chemical Abstracts, vol. 98, No. 98:217459q, 1983.

Abstract of an article entitled "Effect of Lignosulfonate Addition to Urea-Formaldehyde Resin on the Properties of Particle Boards", by Morze et al., ABIPC vol. 55, No. 10, (Apr. 1985) as No. 10730 (M).

Abstract of an article entitled "Supplementary Qualitative Index of Resin KF-MT", Svitkina et al. Plastics Manuf., vol. 97, No. 97:24627q, 1982.

Primary Examiner—John Kight, III
Assistant Examiner—Frederick Krass
Attorney, Agent, or Firm—Andrus, Sceales, Starke & Sawall

[57] ABSTRACT

A non-toxic stable lignosulfonate-urea-formaldehyde composition. The composition is particularly useful as a binder for animal feeds. A method of making the composition is also disclosed.

6 Claims, 1 Drawing Sheet

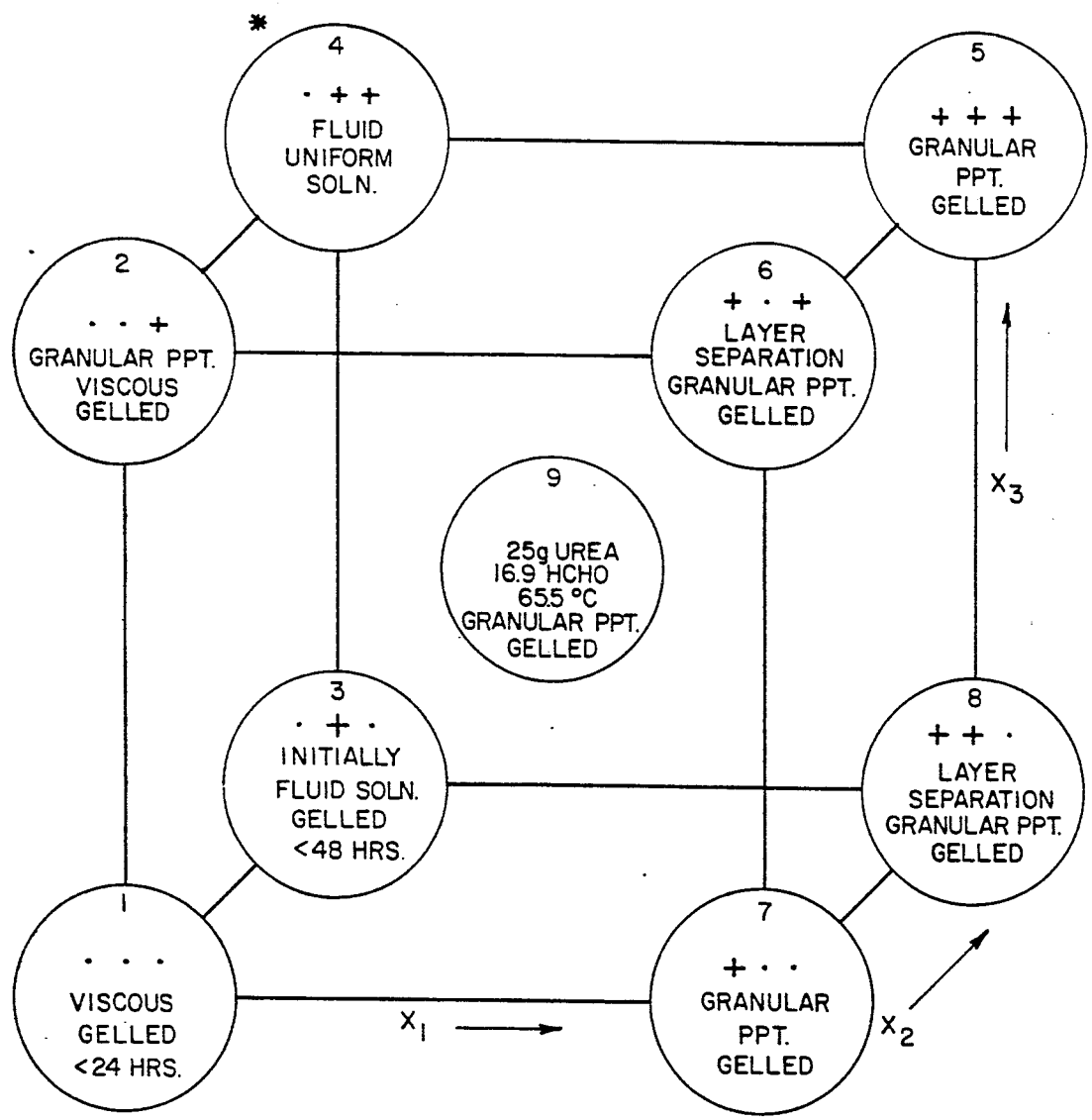
FIG.1 BOX WILSON STUDY OF EFFECTS OF UREA AND FORMALDEHYDE LEVELS AND REACTION TEMPERATURES ON THE CROSS PROPERTIES OF RESIN MADE FROM 70 GRAMS METHYLOLATED HARDWOOD SPENT SULFITE LIQUOR.

NON-TOXIC, STABLE LIGNOSULFONATE-UREA-FORMALDEHYDE COMPOSITION AND METHOD OF PREPARATION THEREOF

This application is a continuation of application Ser. No. 07/328,887, filed Mar. 27, 1989, now abandoned.

BACKGROUND AND SUMMARY OF THE INVENTION

The present invention relates to a lignosulfonate - urea - formaldehyde composition, its use and its preparation.

Lignosulfonate (LS) commonly is used as a generic term for spent sulfite liquor (SSL), LS purified from SSL, sulfonated alkali lignin from alkaline pulping processes, e.g. Kraft Process, and sulfonated hydrolysis lignin obtained from wood saccharification. For the purposes of this invention LS refers to SSL or LS purified from SSL.

LS is obtained from the sulfite pulping process in which wood is cooked with sulfite at elevated temperatures at or below pH 7. In this process the lignin, about 25% of wood, is partially hydrolyzed and sulfonated, and is rendered water soluble. Hemicelluloses are also partially hydrolyzed to reducing sugars and oligosaccharides. The cellulose, approximately the remaining 50% of wood, is left largely intact and insoluble. It is removed leaving soluble LS in solution or more specifically SSL.

SSL, as is, at 8-15% solids, or concentrated, or fractionated, or dried is used commercially in many application areas, for example in dispersion and binding.

LS is used to provide higher green and dried strengths in the manufacture or refractory shapes, face brick, and ceramics. It is used in pelleting of animal feeds to give stronger pellets, less fines development during handling and improved feed consumption and conversion. LS is used to make foundry sand molds. It is used as a binder to granulate various fine substrates in pin mixers, Muller mixers, disk and drum granulators. It is used as a binder in briquetting. LS is coated topically to abate dusting from roads, coal, siliceous materials, other clays, fertilizers and prills.

In these applications, LS adsorbs to surfaces of the substrate, and at correct concentrations can provide tack in the system. Upon drying very strong shapes result. These shapes remain strong as long as they are dry, probably due to extensive hydrogen bonding, since LS contains sulfonic, carboxyl and hydroxyl groups. Water redissolves LS and as a result shapes bound with it will degrade with moisture.

The water solubility of LS has limited its utility. Topical treatments are impermanent, depending upon weather. As a result, various attempts have been made to improve water resistance of LS bound shapes as for example emulsification of hydrophobes in LS, U.S. Pat. No. 4,666,522 by Hollis et al. While the hydrophobe inclusion substantially delays the access of moisture to LS bonds, especially in compacted shapes, the LS is eventually accessible to water and the bonds broken.

On the other hand, for many years phenolformaldehyde resins (PF) and urea-formaldehyde resins (UF) have been used to generate highly water resistant and moderately water resistant bonds, *Handbook of Adhesives* by Skeist. Even moderately water resistant UF bonds far exceed resistance obtained by LS because PF and UF actually react to form covalent bonds.

Because of the economy of using LS verus UF and PF, there are reported numerous efforts at extension of resins with LS.

Holmquist H. W., U.S. Pat. No. 4,186,242 reports hot pressing of wood chips with UF and ammonium lignosulfonate to get reduced formaldehyde emissions, the UF and ammonium lignosulfonate being added separately. Doronin, Yu G et al, Derevoobrah, Prom-st. 1983(3) 11–13 reports that addition of LS at <20% to UF did not adversely affect physico-mechanical properties of hardboard but resulted in decreased water resistance. When LS was added to the resin rather than separately, water miscibility was decreased. Svitkina, M. M. et al, Derevoobrah Prom-st. 1982(4) 4–6 report that adding 15% and 10% LS to surface and middle layers respectively, along with UF, gave good particle board. However, mixing 750–800 kg LS with 25 tons binder at 30°–35° C. gave increased resin viscosity and decreased miscibility to resin with water. Coyle R. P., U.S. Pat. No. 3,931,072 cites alkaline methylolation of LS with formaldehyde and then phenol and more formaldehyde to make a LS - PF resol resin. Bornstein, U.S. Pat. No. 4,130,515 reports an LS-melamine-formaldehyde board binder made by reacting the components in-situ under alkaline conditions. Tomis, B. et al, Czech Patent No. 202,450 reports a water resistant binder from a two step condensation, first condensing 2:1 moles of formaldehyde: urea at pH 7 –pH 9.5, reducing pH to 5.1 with formic acid and condensing additionally with LS, LS being about 10% of the final binder solids. Morze et al, Zb. Ref-Semin. "Pokroky Vyrobe Pouziti Lepidiel Drevopriem" 6:112–121, 1983 showed addition of Calcium LS to UF decreased formaldehyde release but caused deterioration of particle board properties. They recommended a maximum extension of UF to be 20%. In U.S. Pat. No. 3,990,928 Grabowsky shows that addition of small amounts of sodium lignosulfonate improves the cold adhesion of glue UF to wood particles. Azorou, V. I. et al, Soviet Patent No. 1,237,678 makes an alkali lignin UF resin by premethylolation of alkali lignin at pH 9–2, adds urea and condenses at pH 7.5–9.0 and finally adds NH$_4$Cl reducing pH to 5.0–6.5 to further condense and reduce free formaldehyde level. Resin cure was faster and storage time went from 2–3 months to 4–7 months. The highest level of alkali lignin obtained in resin was 17% of solids.

Edler, F. J., U.S. Pat. No. 4,194,997 and U.S. Pat. No. 4,244,846 relates a significant achievement in mixing UF resins and LS. Significant is the fact that Edler reports for the first time being able to obtain UF-LS mixtures containing high levels of LS whch are compatible using very low condensed UF resins. That Edler has a mixture rather than a reaction product is evident in that similar reacted formulations are not compatible and that low solids precipitates UF.

Thiel et al, U.S. Pat. No. 3,994,850 reports a stable resin including 5% to 30% LS by reacting urea and formaldehyde in the presence of lignosulfonates. Keim G. I., U.S. Pat. No. 2,622,979 reports a high strength paper container treated with a LS modified UF resin in which the resin contains 5% to 20% LS on urea. Maier, C. et al, Romanian Patent No. 89,056 reports a three step condensation of formaldehyde with urea, adding 5% to 30% sodium LS in the final polycondensation step.

Krut-ko N. P. et al, Z. Prikl. Spektr. 48(1) 95-98, 1988 studied the reaction of mixtures by infrared spectroscopy. They report evidence that reaction occurs between the sulfo and carbonyl groups of sodium LS giving crosslinking. The effect was intensified by heating.

None of the adhesive or resin work has been able to provide a reacted LS-urea-formaldehyde resin including large amounts of LS, in fact not more than 20%. Furthermore, UF resins typically contain 40% –45% free formaldehyde, less if diluted, which is in itself a hazardous chemical, i.e. a carcinogen. These resins must be handled and used carefully.

The present invention relates to a novel and improved LS-urea-formaldehyde composition, its use and to a method for producing such composition. The invention is a non-toxic, stable composition including in solution about 55 to 95 parts methylol lignosulfonate - urea - formaldehyde polymer, about 1–28 parts sugars, and about 1–30 parts oligosaccharides and a free formaldehyde content of less than 1% on solids. The invention resin is non-toxic to rats, $LD_{50} > 5$ gm/kg body weight, and is non-irritating to skin and eyes. The invention resin is a stable solution for at least two months. It is easily spray dried to provide a powder which can be incorporated as an adhesive or reconstituted to 50% solution.

It is an object of the invention to provide a composition which is suitable for use in the manufacture of hardboard.

It is another object of the invention to provide a composition which is suitable for use in the preparation of high quality animal feed pellets for aquaculture wherein said pellets have extended survival time in water.

Still another object of the invention is to provide a composition which can coat substrates such as siliceous materials, coal, etc. and cure at ambient temperature to eliminate dusting and provide a waterproof barrier. For example waste sites, coal piles, etc.

Still another object of the invention is to provide a composition which can be used in the manufacture of molds and bricks or other shapes which will be resistant to moisture.

Another object of the invention is to provide a low cost composition which is based in large part on a very low cost waste product, spent sulfite liquor, thereby alleviating environmental problems while providing a unique economical resin composition.

The invention is a stable methylol lignosulfonate - urea - formaldehyde resin preferably including, on a solids basis, about 75 parts calcium methylol lignosulfonate - urea - formaldehyde resin, about 12 parts of reducing sugars, about 5 parts ammonium ion and about 13 parts oligosaccharides.

We have discovered that acidic premethylolation of LS to achieve consumption of about 3% formaldehyde on SSL, about 0.8 methylol groups per monomeric unit of the lignosulfonate portion of the SSL, is essential to produce a stable invention with good performance. Without this step we, as others, find reaction of such a high level of LS with urea and formaldehyde gives insolubles formation and gelling. Accordingly, about 2 to 8 parts formaldehyde is reacted with about 70 parts spent sulfite liquor having a range of from about 45 to 65% total solids to form the acid methylolated lignosulfonate. If is more than about 8 parts formaldehyde is employed there is excess formaldehyde which, during the next succeeding step with urea forms UF resin which reacts with the lignosulfonate to form an undesirable insoluble product. Additionally, if less than about 2 parts formaldehyde is used there is insufficient reaction with the lignosulfonate, i.e. there is insufficient methylolation of a lignosulfonate.

The second step involves reaction with urea at about a 3:1 molar ratio to formaldehyde added for the methylolation. The urea-rich reaction provides a chemical environment for reaction of urea with the methylol groups of the methylol-rich LS. Accordingly, about 10 to 30 parts urea on spent sulfite liquor solids is employed. If more than about 23 parts are utilized, an undesirable insoluble product is formed. If less than about 10 parts urea is employed, there is insufficient reaction to obtain the lignosulfonate methylene urea.

After formation of mainly lignosulfonate methylene urea, additional formaldehyde is added to give a total added formaldehyde to urea ratio of about 2.6:1 and further condensation is conducted. If the formaldehyde in this step is added with urea in the prior step, an insoluble gelling composition results because urea preferentially reacts with the formaldehyde rather than the methylol lignosulfonate to form UF in the presence of the lignosulfonate. The UF reacts during heating with the LS to form a high level of insolubles. Accordingly, about 16 to 25 parts formaldehyde is employed in this subsequent formaldehyde reaction with the lignosulfonate methylene urea. Less than about 16 parts results in undesirable insolubles while more than about 25 parts results in excess formaldehyde which is toxic and thus undesirable. As noted above, the total molarity of the formaldehyde to urea in the system is about 2.6 moles of formaldehyde per mole of urea. If less than about 2.4 moles of formaldehyde per mole of urea in the system is employed, the system gells up resulting in undesirable insoluble compounds. As a result, there must be at least a total molarity of about 2.4 or higher in the system in order to properly form the methylol lignosulfonate urea formaldehyde polymer.

Finally, about 6% ammonia on total solids may be added if desired to give pH 7.5–9.0 for the final liquid which is stable for about two months and which can be easily spray dried to a powder. That the chosen amount of ammonia addition gives the desired pH is significant as a measure of desired completion of the final reaction of formaldehyde. If reaction is not completed, the pH will be less than the desired level due to formation of excessive hexamethylenetetramine. Accordingly, about 5 to 8 parts ammonia gives the desired pH to quench the reaction and provide stability therefore. Although ammonia is preferable, any compound or mixture of compounds that raises the pH to between 7.5 to 9.0 may be employed so long as that compound also results in tying up any excess formaldehyde in the system.

The significance of acid methylation for the solubility and stability is great. For example, as reported herein, Azarov VI et al premethylolated alkali lignin under alkaline conditions but did not achieve a product of high lignin content. In alkali or Kraft lignin about one-third of the phenolic nuclei are free in the 5-position ortho to the phenolic hydroxy, Marton J. et al *Lignin Structure and Reactions*, 1966 pp. 125-144. Therefore, methylolation is limited to about 0.33 methylol groups per lignin monomer. In acid methylolation, reaction is preferentially at the site meta to phenolic hydroxyl. There are many more of these sites available and, unlike alkaline catalyzed methylolation, the significance of whether or not the phenolic group is free or involved in a linkage with another monomer disappears. A free phenolic group allows reaction to proceed more easily in alkaline reaction with formaldehyde. That a higher level of methylolation, 0.8/monomer, achieved by the invention allows essentially all of the UF condensate (polymethylene urea) to be attached to the more hydrophillic calcium lignosulfonate providing the desired solubility characteristics.

Isolation of the active resinous component of the composition shows intact sulfo groups and equivalent calcium indicating non-involvement of sulfo groups which Krut-ko et al showed to be involved in reaction when UF resin was mixed and reacted with lignosulfonate such as in the Edler mixtures of UF and SSL.

Furthermore, the composition includes essentially all of the urea reacted with the methylol lignosulfonate.

Clearly there are advantages over prior art in addition to novelty. The invention is non-toxic. The invention can be used widely because there is no dangerous evolution of formaldehyde in unprotected environments. The invention gives bonding of wood particles when used at concentrations of about 1-5% by weight that is essentially equal to that bond quality obtained with PF resin, and a bond far more water resistant than obtainable with UF resin. The invention can be used at a concentration of about 0.5-4% by weight for pelleting animal feeds while PF and UF resins cannot because of toxicity and/or adverse effects on feed utilization and animal growth. The invention based upon waste sulfite liquor can be spread at a concentration of about 0.3-3 gal./yd.$^2$ to dry and cure as a water impervious film at ambient temperatures. Also, when used in concentrations of about 1-5% by weight, as an additive in the manufacture of refractory materials provides water resistant dry shapes which are not appreciably degraded by moisture. For example, the invention is useful in the manufacture of refractory brick and/or ceramics.

BRIEF DESCRIPTION OF THE DRAWING

FIG. 1 is a schematic illustration showing the effects of urea and formaldehyde levels and reaction temperatures on the properties of a resin from acid methylolated SSL.

DESCRIPTION OF THE PREFERRED EMBODIMENT OF THE INVENTION

It is preferred to use calcium base hardwood spent sulfite liquor from the acid sulfite process at 55-60% total solids, 70 parts solids. The preferred pH is 3.0 to pH 3.5. Methylolation is preferably accomplished by adding 3.0-5.0 parts of formaldehyde and reacting 12-24 hours at 90°-95° C. Thereafter, the temperature is reduced to 70°-80° C. Urea, 20 parts, is thereafter added and the solution held at 70°-80° C. for two hours. Subsequently, 22.5 parts additional formaldehyde is added and the solution is reacted at 70°-85° C. for four hours to six hours. Finally, 5.8 parts of ammonia is added giving pH 8.0-8.5 and the solution is cooled.

Calcium base LS is preferred as ammonium LS gives rapid gelling in the reaction. Sodium based LS in the reaction gives resin formation, but the resin has inferior performance as compared to one formed from calcium base LS. It is believed that calcium may catalyze the reaction.

High solids LS is preferred because the reaction generates water and use of 37% formaldehyde causes dilution and a final resin solids of over 45% is desired for maintaining solution, lower cost spray drying and desirable viscosity.

Calcium based hardwood LS is preferred over softwood LS due to lower viscosity, greater solubility and greater stability of the resin.

EXAMPLES

EXAMPLE 1

FIG. 1 shows the significance of levels of formaldehyde and urea and reaction temperatures per generation of an easily handled resin solution from acid methylolated SSL.

EXAMPLE 2

Resin was made using LS from a calcium based hardwood spent sulfite liquor. Analytical data, Table 1, are for the starting LS, the resin itself as described in the invention and fractions of that resin separated after dilution with water. All samples were vacuum dried at 60° C.

The spent sulfite liquor contains 57% as calcium lignosulfonate, the remainder being carbohydrate derived moieties such as sugars and oligosaccharides. All —OCH$_3$ is contributed by the lignosulfonate. All the calcium is from the SSL. Based upon these numbers we can see that the invention includes about 75% LS (SSL), on a vacuum dried basis.

The high OCH$_3$ content of the insolubilized resin fraction cannot mean that it is greater than 100% SSL but indicates that the lignosulfonate and not the carbohydrate components are involved with the actual resin formed. Furthermore, the data indicate that lignosulfonate from the spent sulfite liquor is 60% of the resin and that methylene urea based on nitrogen accounts for about 32% of the resinous solids isolated.

Finally, it is of note that calcium in the resinous isolate is equivalent to sulfonic sulfur indicating free sulfonate groups in the lignosulfonate.

By calculation from the data one gets an average dp of polymethylene urea on the calcium lignosulfonate of 2.7. Furthermore, calculation clearly shows that essentially all of the urea is combined as calcium lignosulfonate polymethylene urea.

TABLE 1

| Parameter | SSL | Invention | Insolubilized Fraction of Invention | Remaining Soluble Fraction |
|---|---|---|---|---|
| % by Weight | 100 | 100 | 23 | 77 |
| % OCH$_3$ | 8.90 | 6.91 | 9.36 | 5.59 |
| % Total N | 0.09 | 11.98 | 12.56 | 11.72 |
| % Total S | 5.60 | 3.46 | 3.09 | 3.65 |
| % Sulfonic S | 5.0 | — | 3.09 | — |
| % Ca | 4.02 | 3.00 | 2.44 | 3.17 |
| % Non-Sulfonic S | | | nil | |

EXAMPLE 3

Resin made according to the preferred embodiment was spray dried at 500° F. inlet and 200° F. outlet temperatures. The powder was added at 1% and 2% by weight to a feed comprising 50% fish meal, 25% wheat flour and 25% ground corn. The mixture was conditioned to 200° C. using live steam and pelleted through 1½ × 5/32 die in a CPM CL-Type 2 mill. Retention time in the system is 30 seconds. A commercial lignosulfonate feed binder popular in aquaculture, available under the trade name Langobin from Quali-Tech Inc. of Chaska, Minn., was also tested at 2%. Results in Table 2 show the invention gives higher quality pellets in terms of pellet durability, PDI. PDI is determined by tumbling pellets according to ASAE 269.1 including four ¾-inch hex nuts per chamber. The invention resin is also about twice as effective in reducing fines as the commercial binder.

TABLE 2

| PDI's and % Fines Reductions in Aquaculture Feed. | | | |
|---|---|---|---|
| Sample Tested | % | PDI | % Fines Reduction |
| Langobin | 2 | 82.5 | 19.0 |
| Invention Resin | 1 | 83.7 | 24.5 |
| Invention Resin | 2 | 87.0 | 39.8 |
| Control | 0 | 78.4 | 0 |

EXAMPLE 4

Pellets made according to Example 3 with 2% invention resin and 2Langobin, a popular commercial binder for aquaculture, were evaluated for hydrostability. Pellets, immersed in water were placed across a 14/64-inch round hole and, via monofilament loops around the cylindrical pellets, suspended on 4.5 gram weights. Hydrostability was measured as minutes until the suspended weight dropped by pulling the monofilament through the immersed pellet. Data in Table 3 show Langobin increased hydrostability by 27% while the invention resin increased hydrostability by 62%.

TABLE 3

| Sample | *Hydrostability, minutes |
|---|---|
| Control | 63 |
| 2% Langobin | 80 |
| 2% Invention | 102 |

*Average 100 pellets for each value.

EXAMPLE 5

This example shows effectiveness in coating a siliceous substrate. A 45° conical pile of dusty fine silica waste, surface area smooth basis 1.1 yd.$^2$, was misted with water to dampen the surface. The invention resin was applied to the surface at 1 gal./yd.$^2$ to completely coat the surface. The coating was allowed to cure 96 hours at ambient temperature.

The pile was then watered by hose for a protracted period. The coating did not dissolve, nor was there any penetration of water through the coating to any sub-surface layer of silica.

EXAMPLE 6

This example shows the effect of coating a pile of western coal received by a utility. Because of the nature of coal and its susceptibility to degradation on standing, the pile was pretreated with 0.8 gal./yd.$^2$ of solution containing 0.012 lb./gal. Aerosol OT-75 and 0.017 lb./gal. sodium sulfate. The invention was then applied at 0.8 gal./yd.$^2$ After cure for 72 hours at ambient temperature the coating remained impervious to water after inundations of water over a period of eight weeks.

EXAMPLE 7

This example illustrates the use of the invention in hardboard versus a commercially used phenol-formaldehyde resin. 1040 grams fiber, 5.8% moisture was mixed 10 minutes in a Littleford mixer with 30 grams resin solids and 120 grams water. The treated fiber is dried at 105° C. Board is pressed for 30 seconds at 400° F. and 500 PSI and then for six minutes at 250 PSI. Data in Table 4. show the invention, a methylol lignosulfonate-urea resin, performs as well as the commercial PF.

TABLE 4

| | Hardboard Test Results | | | | |
|---|---|---|---|---|---|
| Sample | Density g/cc | % Weight Increase | % Caliper In. | % Weight Increase | % Caliper In. |
| PF Resin | 0.880 | 17.6 | 8.2 | 72 | 34 |
| Invention | 0.866 | 17.6 | 8.7 | 74 | 36 |

EXAMPLE 8

Data in Tables 5-10 show that the composition of the present invention is not acutely toxic to rats nor a primary irritant of eyes or skin of rabbits. Weight gain in rats was unaffected.

TABLE 5

CLINICAL OBSERVATIONS FOR THE ACUTE ORAL TOXICITY STUDY OF RD-0160-25 46.02% SOLIDS IN SPRAGUE-DAWLEY RATS
Dose 5000 mg/kg B.W.

| ANIMAL # & SEX | HOUR | | | | DAY | | | | | | | | | | |
|---|---|---|---|---|---|---|---|---|---|---|---|---|---|---|---|
| | 3 | 24 | 48 | 72 | 4 | 5 | 6 | 7 | 8 | 9 | 10 | 11 | 12 | 13 | 14 |
| 5628M | N | N | N | N | N | N | N | N | N | N | N | N | N | N | N |
| 5629M | N | N | N | N | N | N | N | N | N | N | N | N | N | N | N |
| 5630M | N | N | N | N | N | N | N | N | N | N | N | N | N | N | N |
| 5631M | N | N | N | N | N | N | N | N | N | N | N | N | N | N | N |
| 5632M | N | N | N | N | N | N | N | N | N | N | N | N | N | N | N |
| 5633F | N | N | N | N | N | N | N | N | N | N | N | N | N | N | N |
| 5634F | N | N | N | N | N | N | N | N | N | N | N | N | N | N | N |
| 5635F | N | N | N | N | N | N | N | N | N | N | N | N | N | N | N |
| 5636F | N | N | N | N | N | N | N | N | N | N | N | N | N | N | N |
| 5637F | N | N | N | N | N | N | N | N | N | N | N | N | N | N | N |

N = NORMAL

TABLE 6

BODY WEIGHTS (GRAMS) FOR THE ACUTE ORAL TOXICITY STUDY OF RD-0160-25 46.02% SOLIDS IN SPRAGUE-DAWLEY RATS
Dose 5000 mg/kg B.W.

| ANIMAL # & SEX | DAYS | | |
|---|---|---|---|
| | 0 | 7 | 14 |
| 5628M | 212 | 288 | 359 |
| 5629M | 242 | 340 | 393 |
| 5630M | 208 | 283 | 335 |
| 5631M | 226 | 308 | 385 |
| 5632M | 227 | 313 | 374 |
| MEAN= | 223 | 306 | 369 |
| 5633F | 191 | 233 | 260 |

TABLE 6-continued

BODY WEIGHTS (GRAMS) FOR THE ACUTE
ORAL TOXICITY STUDY OF RD-0160-25
46.02% SOLIDS IN SPRAGUE-DAWLEY RATS
Dose 5000 mg/kg B.W.

| ANIMAL # & SEX | DAYS | | |
|---|---|---|---|
|  | 0 | 7 | 14 |
| 5634F | 190 | 237 | 262 |
| 5635F | 189 | 228 | 250 |
| 5636F | 194 | 228 | 250 |
| 5637F | 184 | 214 | 228 |
| MEAN= | 190 | 228 | 250 |

TABLE 7

GROSS AUTOPSY FINDINGS FOR THE ACUTE
ORAL TOXICITY STUDY OF RD-0160-25
46.02% SOLIDS IN SPRAGUE-DAWLEY RATS
Dose 5000 mg/kg B.W.

| ANIMAL # & SEX | GROSS NECROPSY FINDINGS |
|---|---|
| 5628M | Normal |
| 5629M | Normal |
| 5630M | Normal |
| 5631M | Normal |
| 5632M | Normal |
| 5633F | Normal |
| 5634F | Normal |
| 5635F | Normal |
| 5636F | Normal |
| 5637F | Normal |

TABLE 8

INDIVIDUAL SCORES FOR THE EVALUATION OF
THE PRIMARY SKIN IRRITATION OF
RD-0160-25 46.02% SOLIDS
IN RABBITS

| ANIMAL NUMBER | 1 HR. | | 24 HRS. | | 48 HRS. | | 72 HRS. | |
|---|---|---|---|---|---|---|---|---|
|  | ER | ED | ER | ED | ER | ED | ER | ED |
| 8140M | 0 | 0 | 0 | 0 | 0 | 0 | 0 | 0 |
| 8141M | 0 | 0 | 0 | 0 | 0 | 0 | 0 | 0 |
| 8142M | 0 | 0 | 0 | 0 | 0 | 0 | 0 | 0 |
| 8143F | 0 | 0 | 0 | 0 | 0 | 0 | 0 | 0 |
| 8144F | 0 | 0 | 0 | 0 | 0 | 0 | 0 | 0 |
| 8145F | 0 | 0 | 0 | 0 | 0 | 0 | 0 | 0 |

ER - ERYTHEMA
ED - EDEMA

TABLE 9

OCULAR RESULTS IN RABBITS RECEIVING
RD-0160-25 46.02% SOLIDS

| ANIMAL NUMBER | PARAMETER | HOURS | | | |
|---|---|---|---|---|---|
|  |  | 0 | 1 | 24 | 48 | 72 |
| 8134M | Cornea-Opacity | 0 | 1 | 0 | 0 | 0 |
|  | Area | 0 | 1 | 0 | 0 | 0 |
|  | Iris-value | 0 | 0 | 0 | 0 | 0 |
|  | Conjunctivae |  |  |  |  |  |
|  | A. Redness | 0 | 1 | 0 | 0 | 0 |
|  | B. Chemosis | 0 | 1 | 0 | 0 | 0 |
|  | C. Discharge | 0 | 1 | 0 | 0 | 0 |
| 8135M | Cornea-Opacity | 0 | 1 | 0 | 0 | 0 |
|  | Area | 0 | 3 | 0 | 0 | 0 |
|  | Iris-value | 0 | 0 | 0 | 0 | 0 |
|  | Conjunctivae |  |  |  |  |  |
|  | A. Redness | 0 | 1 | 0 | 0 | 0 |
|  | B. Chemosis | 0 | 1 | 0 | 0 | 0 |
|  | C. Discharge | 0 | 1 | 0 | 0 | 0 |
| 8136M | Cornea-Opacity | 0 | 0 | 0 | 0 | 0 |
|  | Area | 0 | 0 | 0 | 0 | 0 |
|  | Iris-value | 0 | 0 | 0 | 0 | 0 |
|  | Conjunctivae |  |  |  |  |  |
|  | A. Redness | 0 | 1 | 0 | 0 | 0 |
|  | B. Chemosis | 0 | 1 | 0 | 0 | 0 |
|  | C. Discharge | 0 | 1 | 0 | 0 | 0 |
| 8137F | Cornea-Opacity | 0 | 0 | 0 | 0 | 0 |
|  | Area | 0 | 0 | 0 | 0 | 0 |
|  | Iris-value | 0 | 0 | 0 | 0 | 0 |
|  | Conjunctivae |  |  |  |  |  |
|  | A. Redness | 0 | 1 | 0 | 0 | 0 |
|  | B. Chemosis | 0 | 0 | 0 | 0 | 0 |
|  | C. Discharge | 0 | 0 | 0 | 0 | 0 |
| 8138F | Cornea-Opacity | 0 | 0 | 0 | 0 | 0 |
|  | Area | 0 | 0 | 0 | 0 | 0 |
|  | Iris-value | 0 | 0 | 0 | 0 | 0 |
|  | Conjunctivae |  |  |  |  |  |
|  | A. Redness | 0 | 1 | 0 | 0 | 0 |
|  | B. Chemosis | 0 | 1 | 0 | 0 | 0 |
|  | C. Discharge | 0 | 1 | 0 | 0 | 0 |
| 8139F | Cornea-Opacity | 0 | 0 | 0 | 0 | 0 |
|  | Area | 0 | 0 | 0 | 0 | 0 |
|  | Iris-value | 0 | 0 | 0 | 0 | 0 |
|  | Conjunctivae |  |  |  |  |  |
|  | A. Redness | 0 | 1 | 0 | 0 | 0 |
|  | B. Chemosis | 0 | 1 | 0 | 0 | 0 |
|  | C. Discharge | 0 | 2 | 0 | 0 | 0 |

Various modes of carrying out the invention are contemplated as being within the scope of the following claims particularly pointing out and distinctly claiming the subject matter regarded as the invention.

We claim:

1. A stable composition including in solution about 55 to 95 parts methylol lignosulfonate-urea-formaldehyde polymer, about 1–28 parts sugards, and about 1–30 parts oligosaccharides, wherein about 55–80% of the total solids content is sulfite liquor resulting from sequentially reacting spent sulfite liquor with formaldehyde at acidic pH to form methylol lignosulfonate, containing about 0.8 methylol groups per monomeric unit of the lignosulfonate portion of the spent sulfite liquor, thereafter reacting the methylol-lignosulfonate containing spent sulfite liquor with an excess of urea to form lignosulfonate-methylene-urea in the spent sulfite liquor, and thereafter reacting the lignosulfonate-methylene-urea material with additional formaldehyde to give a molar equivalency of formaldehyde to urea in excess of 2:1 to obtain methylol-lignosulfonate-urea-formaldehyde polymer, wherein the ratios of urea to spent sulfite liquor to formaldehyde on a weight basis range from 1:3:1.4 to 1:7:2 respectively after the reaction sequence.

2. A composition according to claim 1 in which the methylol lignosulfonate is calcium base.

3. A composition according to claim 1 in which the methylol lignosulfonate is sodium base.

4. A composition according to claim 1 in which the methylol lignosulfonate is derived from spent sulfite liquor from the acid sulfite pulping process of softwood.

5. A composition according to claim 1 in which the methylol lignosulfonate is derived from spent sulfite liquor from the acid sulfite pulping process of hardwood.

6. A composition according to claim 1 in which the composition is in spray dried powder form.

* * * * *

UNITED STATES PATENT AND TRADEMARK OFFICE
CERTIFICATE OF CORRECTION

PATENT NO. : 5,075,402
DATED : December 24, 1991
INVENTOR(S) : Linda G. Schmitt et al It is certified that error appears in the above-identified patent and that said Letters Patent is hereby corrected as shown below:

CLAIM 1,           Delete "sugards" and stubstitute
Column 10, Line 3  therefore --- sugars ---

Signed and Sealed this

Thirtieth Day of March, 1993

*Attest:*

STEPHEN G. KUNIN

*Attesting Officer*          *Acting Commissioner of Patents and Trademarks*